US009292621B1

(12) United States Patent
Roth

(10) Patent No.: US 9,292,621 B1
(45) Date of Patent: Mar. 22, 2016

(54) MANAGING AUTOCORRECT ACTIONS

(75) Inventor: Gregory B. Roth, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/611,550

(22) Filed: Sep. 12, 2012

(51) Int. Cl.
*G06F 17/30* (2006.01)
*G06F 17/27* (2006.01)

(52) U.S. Cl.
CPC ........ *G06F 17/3097* (2013.01); *G06F 17/2735* (2013.01)

(58) Field of Classification Search
None
See application file for complete search history.

(56) References Cited

U.S. PATENT DOCUMENTS

| | | | |
|---|---|---|---|
| 7,296,019 | B1 | 11/2007 | Chandrasekar et al. |
| 2005/0149499 | A1 | 7/2005 | Franz et al. |
| 2007/0192166 | A1* | 8/2007 | Van Luchene ................ 705/10 |
| 2007/0208738 | A1 | 9/2007 | Morgan |
| 2008/0109401 | A1* | 5/2008 | Sareen et al. .................... 707/3 |
| 2008/0195571 | A1 | 8/2008 | Furuuchi et al. |
| 2009/0055380 | A1 | 2/2009 | Peng et al. |
| 2009/0249232 | A1* | 10/2009 | Lundy et al. .................. 715/764 |
| 2011/0016111 | A1 | 1/2011 | Xie et al. |
| 2011/0184720 | A1* | 7/2011 | Zangvil ............................ 704/2 |
| 2011/0202876 | A1* | 8/2011 | Badger et al. ................. 715/816 |
| 2012/0143897 | A1* | 6/2012 | Wei et al. ...................... 707/769 |
| 2013/0151956 | A1* | 6/2013 | Allen ............................. 715/256 |

OTHER PUBLICATIONS

"TXT-Fixer for Sent Text Messages", IP.com Prior Art Database Technical Disclosure No. IPCOM000191808D, Jan. 15, 2010.*
"Visual Notification of Automated Alterations", IP.com Prior Art Database Technical Disclosure No. IPCOM000213487D, Dec. 15, 2011.*
"Sandboxing words in textual autocorrection software", IP.com Prior Art Database Technical Disclosure No. IPCOM000215903D, Mar. 15, 2012.*
"A method of detecting and fixing users' typographical errors" IP.com Prior Art Database Technical Disclosure No. IPCOM000195312D, Apr. 29, 2010.*
USPTO Final Office Action dated Jan. 14, 2015, for U.S. Appl. No. 13/611,489.
USPTO Non-Final Office Action dated Dec. 13, 2013, for U.S. Appl. No. 13/611,489, filed Sep. 12, 2012, 30 pages.
USPTO Non-Final Office Action dated Aug. 27, 2014, for U.S. Appl. No. 13/611,489, filed Sep. 12, 2012, 30 pages.

\* cited by examiner

*Primary Examiner* — Alex Gofman
*Assistant Examiner* — Umar Mian
(74) *Attorney, Agent, or Firm* — Hogan Lovells US LLP

(57) ABSTRACT

Text input that is automatically "corrected" by an auto-correction process can be analyzed to determine whether to also include text as input before the correction. A set of words particular to an environment can be run through a number of auto-correct processes to determine which words are likely to be corrected, as well as the corrected versions. These "corrected" versions can be added to an index or other collection as synonyms, or alternatives, for the uncorrected words. When a request or other input is received that includes a corrected term, a determination can be made as to whether to include content for the synonymous uncorrected term. Such an approach can enable a user to obtain content that is more likely of interest to the user based at least in part upon known corrections made to terms that did not necessarily need correcting.

25 Claims, 7 Drawing Sheets

MANAGING AUTOCORRECT ACTIONS

BACKGROUND

People are increasingly relying on portable computing devices for communication, including not only telephonic communication but also texting, instant messaging, chat, and other such communication channels. A potential downside to at least some of these types of communication is that it can be relatively difficult for a user to accurately enter information on these devices. For example, a user's thumb is often significantly larger that the size of a key or virtual button displayed on a touch screen of a smart phone or other such device, which often results in the user selecting an improper element, such as the wrong key on a virtual keyboard. In order to assist the user in entering text on these devices, many portable devices utilize one or more auto-correct algorithms that analyze text that was inputted to the device, and attempt to correct for minor typographical errors that the user might have entered, such as may include letters that were one character off, words that were misspelled, etc. These approaches generally rely on a dictionary stored on the portable device, which contains a limited number of entries. Oftentimes, words such as proper nouns, product names, foreign words, and other such entries might be mistakenly "corrected" by the algorithm, which can be frustrating for the user if the user obtains irrelevant results or content, as well as if the user has to re-enter the information a number of times in order for the text to be processed as entered by the user.

BRIEF DESCRIPTION OF THE DRAWINGS

Various embodiments in accordance with the present disclosure will be described with reference to the drawings, in which.

DETAILED DESCRIPTION

Approaches in accordance with various embodiments of the present disclosure may overcome one or more of the aforementioned and other deficiencies experienced in conventional approaches to providing input to, or determining information for, an electronic device. In particular, approaches discussed herein enable content to be provided to a user that relates to a corrected term and/or a term before auto-correction was applied. In at least some embodiments a group of words relevant to a particular environment can be run through one or more auto-correction processes to determine which terms will be auto-corrected. For each term likely to be auto-corrected, the "corrected" version can be added as a synonym, such that any search or request including that synonym can also include results for the environment-particular word. Different weightings or approaches can be used to determine which results or content to show to the user, and in what order. In at least some embodiments, a client device submitting a request can include logic to indicate that an auto-correction has been made, include both corrected and uncorrected terms, or automatically undo an autocorrect when the certainty reaches a correction threshold. In other embodiments, a user might be prompted to indicate which version to use, or might receive an option to view content relating to one version or the other.

Many other alternatives and variations are described and suggested below in relation to at least some of the various embodiments.

Figure 1A:
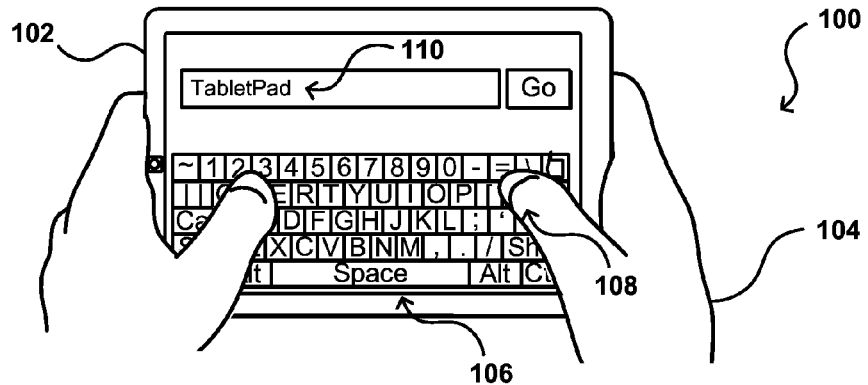
FIGS. 1(a), 1(b), and 1(c) illustrate example ways in which text is automatically corrected by different computing devices.

FIG. 1(a) illustrates an example situation 100 wherein a user is holding a portable computing device 102 in the user's hands 104. The computing device 102 can be any appropriate device, such as a smart phone, tablet computer, or personal data assistant, among other such options. Further, although a portable computing device is shown it should be understood that other types of devices, such as desktop or notebook computers, can be utilized as well within the scope of the various embodiments. In this example, the user is attempting to enter text by selecting keys of a virtual keyboard 106 displayed on a display screen of the computing device. The user is able to use one or more fingers, thumbs, or other such objects to contact the display screen in areas associated with various alphanumeric characters in order to indicate characters to be utilized by the device. The touches can be detected by capacitive or resistive touch technologies, using imaging technology, or via any other approach useful for determining position-based input, among other text entry options. As can be seen, the user's thumb is relatively large compared to the keys of the virtual keyboard, which can make it relatively difficult to select the proper key and avoid inadvertently selecting one of the nearby keys. Even though auto-correct is useful in conventional settings to correct for typographical errors, for example, auto-correct algorithms can be particularly useful for portable computing devices where a user might have actually intended to spell a word correctly, or otherwise provide correct input, but the physical limitations of the device might have led the user to inadvertently select one or more incorrect characters.

For example, a user of a portable device might intend to enter a word such as "house" but instead inadvertently select an incorrect letter and provides input such as "houde," which is one letter off but could result in incorrect and/or irrelevant results or content if accepted as input. Accordingly, based at least in part upon patterns of typographical errors and other such information, a conventional auto-correct algorithm can take input such as "houde" and determine that the user likely meant "house," and can automatically correct the input, showing the user the change in case the algorithm is incorrect so the user can have an opportunity to change the input. Conventional approaches for automatically correcting text input are well known in the art and as such will not be discussed in detail herein.

As mentioned, in many instances the ability of an auto-correct algorithm or process to successfully correct text input is limited by the size and contents of the library or dictionary utilized by the process. Particularly for portable computing devices with limited memory and storage, these dictionaries can be limited to the most common words or terms. In many cases, a user might want to enter a proper noun, such as the name of a person or place, when typing a text message, email message, or social networking post, among other such entries. In many cases, these nouns will not be in the dictionary and the auto-correct process will attempt to correct those entries to terms in the dictionary. Similarly, if the user is searching for content about products or manufacturers, those words also may not be found in a typical dictionary, such that these terms also can be automatically "corrected." Such changes can be frustrating for a user, or can at least degrade the user experience.

For example, in FIG. 1(a) the user has entered the name 110 of a product in which the user has interest, namely a "TabletPad." Since the product name is not a common word, and might not be popular enough to include in a general auto-correct dictionary, an auto-correct algorithm running on the device 102 and monitoring the input might attempt to correct this to a term in the dictionary that is similar, and meets the criteria for being selected as the likely intended input. As illustrated in the situation 120 of FIG. 1(b), the algorithm running on the computing device has analyzed the input "TablePad" and automatically adjusted the input to "tabletop." As should be apparent, if the user was entering the product name in a search engine to attempt to locate a specific type of computing device, the results that are returned for the term "tabletop" will likely not be particularly relevant. In some instances if the user had noticed that the term had been changed the user could have backspaced, deleted, re-entered, or otherwise adjusted the input back to the original input, but in some situations this has to be performed multiple times, or a specific process utilized, in order for the term "TabletPad" to be allowed without being automatically corrected.

Another issue resides in the fact that, even if a user causes a term to be added to a dictionary on one device, that term will not be added to dictionaries on other devices, such that the user would have the same problem on other devices. Further, different types of devices from different manufacturers or sources, or even different versions of the same type of device, can utilize different dictionaries and/or auto-correct algorithms such that different terms might be used when correcting a word or phrase. For example, FIG. 1 (c) illustrates an example situation 140 wherein a user has entered the same TabletPad term using a virtual keyboard 144 displayed on a different computing device 142. This device uses a different algorithm than the device of FIG. 1(b), and thus corrects the term to "tablespoon" instead of "tabletop." Not only is the suggested correction different, but is likely to lead to even less relevant results or content.

Accordingly, approaches in accordance with various embodiments can attempt to account for changes made, or attempted to be made, by various auto-correct algorithms, such as by determining words or terms that are corrected by these algorithms and detecting submission or use of one of the auto-corrected versions. These actions can be performed on the device where the text is entered, on a device receiving the text, or at any other appropriate location. These approaches can attempt to undo the corrections in some embodiments, or supplement the corrections in other embodiments, among other such options.

Figure 2:
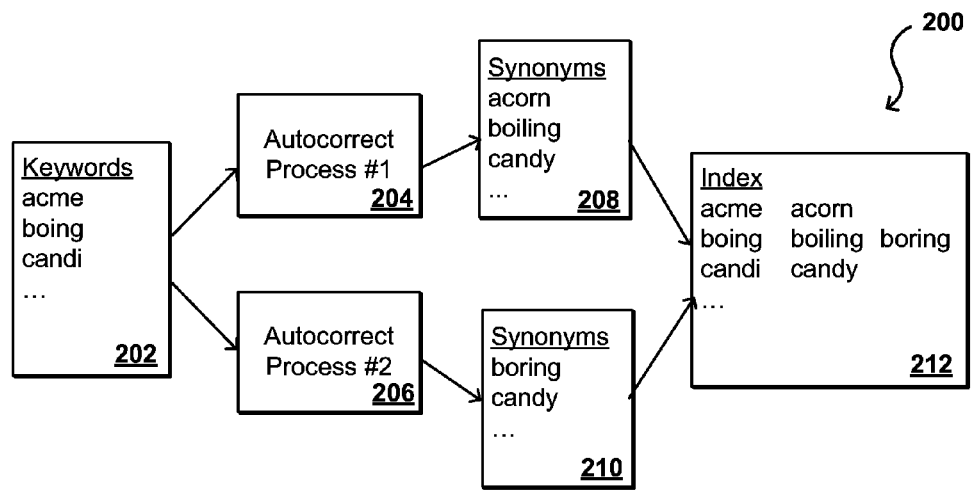
FIG. 2 illustrates an example approach to generating an environment-specific index that can be used in accordance with various embodiments.

FIG. 2 illustrates an example approach 200 that can be utilized in accordance with various embodiments. As mentioned, a user might submit text to a provider of a certain type of product or content, such as an electronic retailer that offers products or a media provider that enables a user to stream content. For each of these types of providers, there can be names of people or places, product names, or other relatively unique or specific words or terms that might not be included in standard auto-correct dictionaries. Accordingly, an approach in accordance with various embodiments includes both an offline portion and an online portion, where the offline portion includes determining how each of a number of auto-correct algorithms would correct one of those terms, and including the "corrected" versions as synonyms or other entries that are related to the specific terms.

For example, in FIG. 2 a provider (or other such entity) selects a set of keywords 202 or terms to be run through each of a set of autocorrect processes 204, 206. The set of keywords can include all words in a dictionary or index for the provider, or can include only those terms that are determined to not reside in a conventional auto-correct index, among other such options, as may be specific to an environment or context of the provider. The auto-correct processes 204, 206 can be executed or utilized in any appropriate manner, such as by running an emulator for a respective device, performing a series of entries on a respective device, obtaining and running at least one local copy of the process, etc. Each autocorrect process 204, 206 operated on the list of keywords 202 will output a set of corrected words 208, 210, which are referred to herein as synonyms. Not every word entered into an auto-correct process may have a corrected version, and based on context or other information a given word might have different corrected versions. In at least some embodiments, the synonyms output by each of the processes can be added to a dictionary or search index 212, for example. In a search situation, adding each corrected version to an index as a synonym for the original term can enable a search including one of the corrected terms to also include results for the uncorrected term.

Figure 1B:
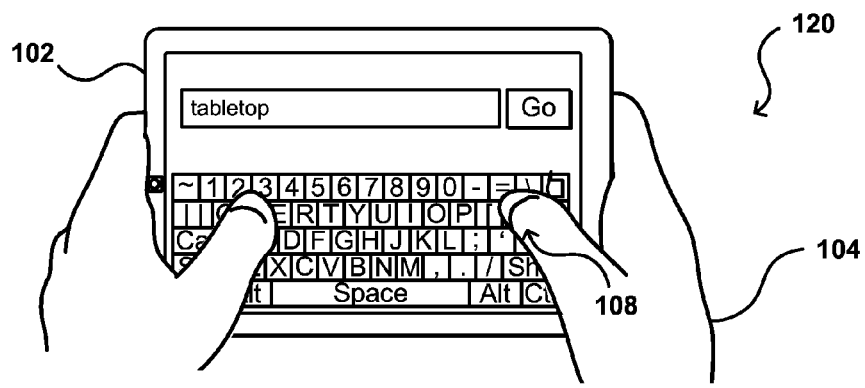
Figure 1C:
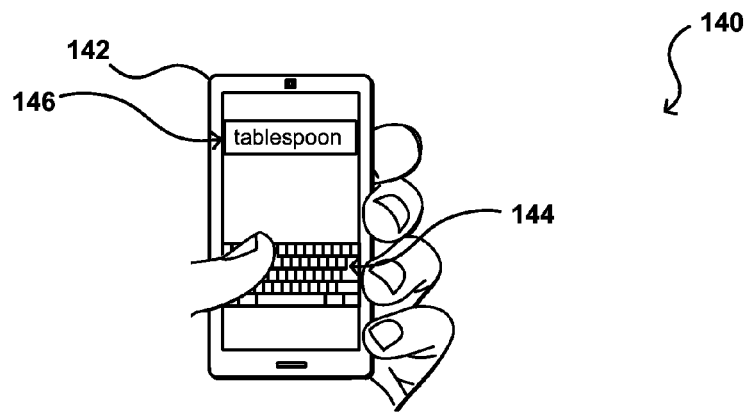

As an example, if a query is received from a device such as the type illustrated in FIG. 1(b), and the query includes the term "tabletop," a search engine examining the index can see that, either for that type of device or any type of device, "TabletPad" is a synonym that can be used for searching. In this way, the user can receive back results for both tabletop and tabletpad, which will then likely include at least some correct results, whether the original term was corrected or not. In some embodiments a weighting or other such process might be applied to affect where each type of result appears in the result ranking. For example, if the user is submitting a search to a site that sells TabletPad products but nothing tabletop related, the TabletPad results could be rated more highly. The weightings might also be adjusted depending on the type of device used, such as may be indicative of the likeliness that the term was autocorrected to tabletop. Other approaches might weight the corrected term that the user actually submitted more highly, among other such options. Such an approach can be useful in situations such as where a query is received from a device to a (logically) centralized service that attempts to determine what the user actually entered on a client device having submitted the query.

Figure 3A:
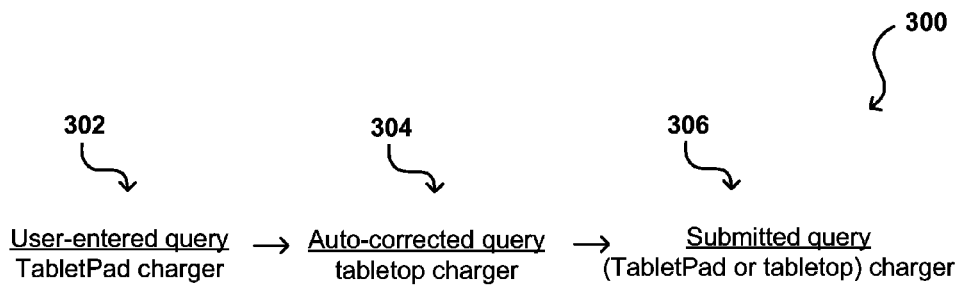
FIGS. 3(a) and 3(b) illustrate example approaches to managing a correction of a query term that can be utilized in accordance with various embodiments.

In some embodiments, at least some of the logic or analysis can be performed on a client device as well. For example, FIG. 3(a) illustrates an example flow 300 that can be used in accordance with various embodiments. In this example, a user enters a query 302 on a computing device. The query in this example is "TabletPad charger." If the device has a local copy of the index with the synonyms, or can access the synonyms, the device can cause the query 306 that is submitted to a search service to include both the original "TabletPad" and corrected "tabletop" versions of a word, such that the search results can include results for both options, even if the search service does not itself determine appropriate synonyms based on auto-corrected terms. In another approach, an application or script executing on a client device (such as JavaScript executing in a browser) can detect the auto-correction, and can signify that a correction was made when submitting the query. In cases where the script can capture certain actions or information, the script might be able to determine that an auto-correction was made, and automatically cause both versions (corrected and un-corrected) to be submitted.

Figure 3B:
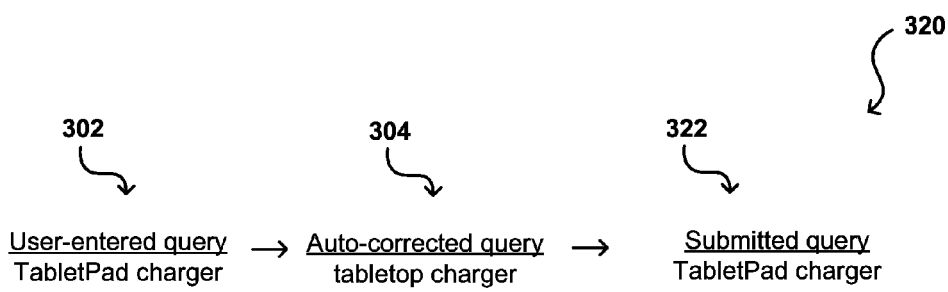

In some embodiments, logic or contextual information can be used to determine which version to submit. For example, FIG. 3(b) illustrates an example flow 320 wherein a user again submits the query 302 "TabletPad charger" which is auto-corrected to the query 304 "tabletop charger." In at least some embodiments, the client device might compare the information to a local data store or data in a remote location to determine context or other information useful in determining an appropriate query. For example, if the user is using an application related to an electronics retailer or is browsing a site for an electronics retailer, the application or device might be able to determine that "TabletPad charger" is a much more often-submitted query, or has much stronger matches, than "tabletop charger." Accordingly, the device could choose to submit only "TabletPad charger" as the submitted query 322, or could choose to filter the returned results based on the context. A similar approach could be taken by a server or service receiving the query, which can determine which if any synonyms are more likely for the current context, and can either only search based on those query terms or can filter or weight the results based on the contextual information, among other such options.

An additional benefit of adding domain- and/or environment-specific terms to a dictionary, index, or other file or data store utilized for auto-correct processes is that the terms in the sets can be leveraged by multiple types of applications or services that utilize auto-correct functionality. For example, an email service, texting service, or messaging service executing on a server, or in a multi-server or "cloud' environment, might include an auto-correct feature that can leverage these terms or term sets in order to attempt to determine words that might have been autocorrected by an application executing on a client device having generated a received message, communication, file, or other data object. This can include, for example, calculating or otherwise determining a likelihood that a word was improperly auto-corrected based at least in part upon locating a matching domain-specific term, and then substituting the domain specific term when the likelihood at least meets a specified correction threshold or at least one correction criterion. In some cases, a word might be "uncorrected" automatically, or an indication might be added indicating that the word may have been improperly auto-corrected. In some cases, the determination of words that may have been auto-corrected might be based at least in part upon the type of the device generating the communication. In some embodiments, context information can be used to assist in determining which words likely were improperly auto-corrected, at least as relates to the domain- and/or environment-specific terms. For services that might also, or alternatively, perform at least some auto-correction on the server side, or in the cloud, for example, one or more auto-correct dictionaries, indexes, or other files also can be extended to improve auto-correct functionality remote from a client device as well. Any application or service utilizing an auto-correct feature can potentially leverage this and other sets, indexes, or dictionaries discussed herein. Further, such an approach enables different sets of terms to be applied when a user or client device is in a work context than for a personal context, for example, wherein work-specific terms might be utilized when the user is at work, accessing a work account, or on a work computer, while more informal terms such as slang or Internet lingo (e.g., LOL or noob) might be added in a personal context, but might not be appropriate in a work context.

Another benefit to the improvement of the autocorrect feature relates to advertising. A user might submit a query with a term that has been autocorrected. If the original term is known or can be determined as likely having been autocorrected, an advertising service can determine what the user likely entered, and then can serve ads that match the entered query (if the autocorrect was likely incorrect) so the ads will more likely be of interest to the user. In such cases, the advertising might be more accurate than the search results, which can prompt the query service or application to utilize the expanded dictionary or additional term sets in order to improve the quality of the search results. Various other applications or services can leverage the improved autocorrect functionality as well, as should be apparent in light of the teachings and suggestions contained herein.

Figure 4:
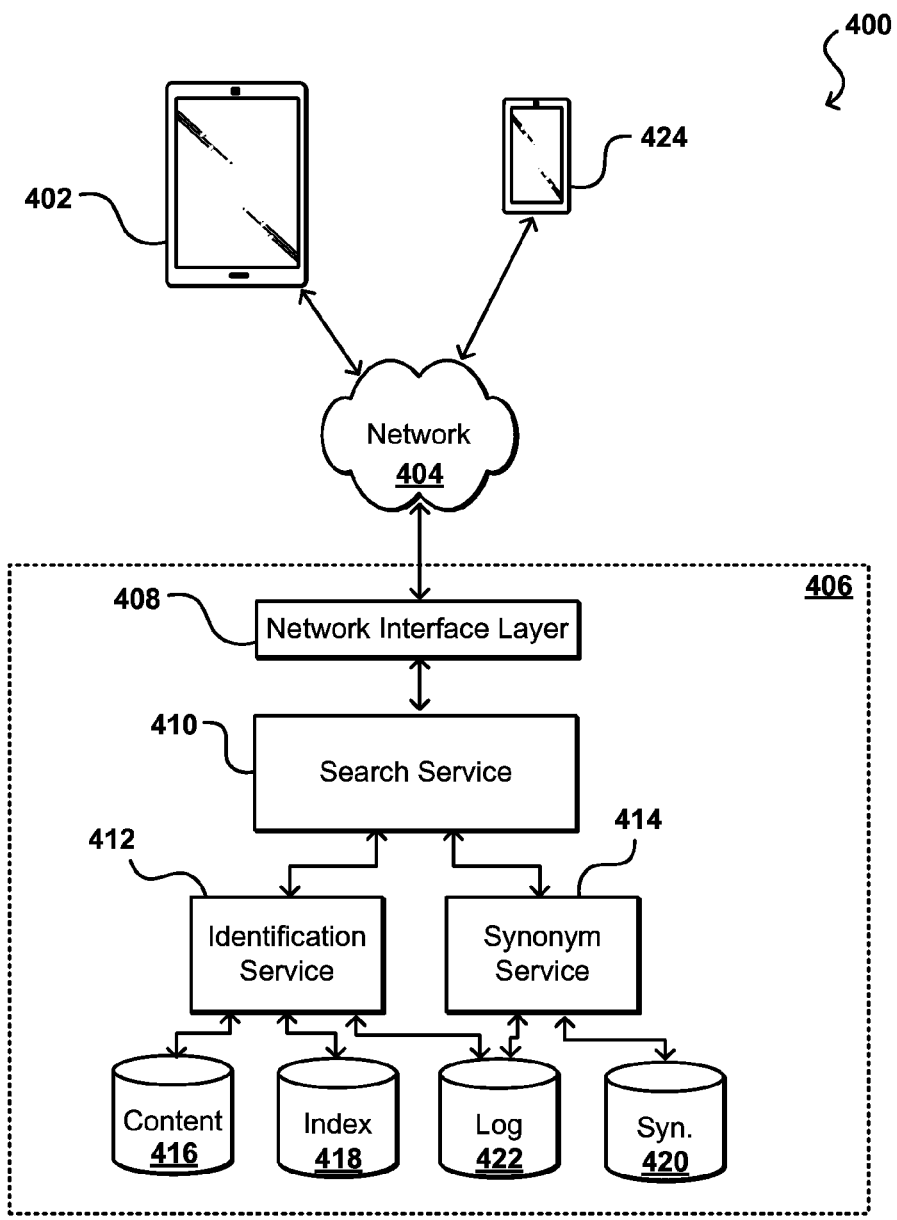
FIG. 4 illustrates an example environment in which auto-corrected text can be managed in accordance with various embodiments.

FIG. 4 illustrates an example environment 400 in which various embodiments can be implemented. In this example, a number of different client devices 402, 424 can communicate with a content provider 406, such as a search service or electronic marketplace, across at least one network 404. The client devices can be any appropriate computing devices able to communicate and process information, and the network can include any appropriate network(s) capable of transmitting that information, such as may include one or more wired or wireless networks such as a local area network (LAN), the Internet, and Ethernet or intranet, a cellular network, Wi-Fi, and the like. The communications can be received to a network interface layer 408 of the provider system 406, which can include any of a number of components known for receiving and directing electronic communications, as may include one or more Web servers, routers, switches, application programming interfaces (APIs), etc. In an example where each of the client devices 402, 424 is able to submit one or more queries including one or more search terms in order to locate content, those queries (or information for those queries) can be directed to a search service 410 or other component(s) of the provider environment.

In at least some embodiments, the search service 410 can direct information for the query to an identification service 412, or other such component that is able to match the query against at least one search index 418 to locate matching entries in the index, and then pull content for those matching entries from at least one content data store 416 or other such location. Approaches to using an index to find results that match a query are well known in the art and as such will not be discussed in detail herein.

In at least some embodiments the search service 410 might process or modify the query before submitting the query to the identification service 412. This can include conventional approaches such as making query terms lower case, removing stop words, and the like. The search service in at least some embodiments can also contact a synonym service 414 or other such component (of the provider system or otherwise) to attempt to determine whether one or more synonyms of one or more terms in the query should be used in addition to, or in place of, one of the query terms. As discussed, in some embodiments the synonym service can analyze synonyms contained in a synonym data store 420 to attempt to determine whether to add or replace terms in the query, as may be based upon the type of the client device or other such information. In some embodiments a synonym service can determine the synonyms and then write the terms in the index 418 accessed by the identification service. Various other approaches can be used as well. In at least some embodiments the synonym service 414, identification service 412, and/or search service 410 can update information in a log data store 422 or other repository when a new synonym or auto-corrected word is detected, a correction is correctly or incorrectly identified, etc. As discussed, in at least some embodiments at least some of the functionality can also, or alternatively, be included in at least one of the client devices 402, 424. In some embodiments, the synonym service can also be provided by, or made available to, one or more third parties.

Figure 5A:
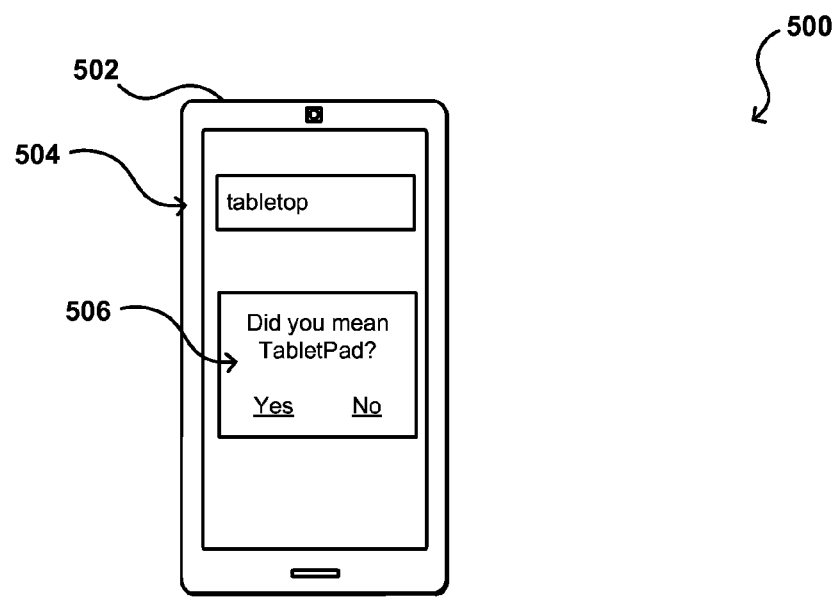
FIGS. 5(a) and 5(b) illustrate example displays that can be provided in response to detecting an automatic correction of text that can be utilized in accordance with various embodiments.
Figure 5B:
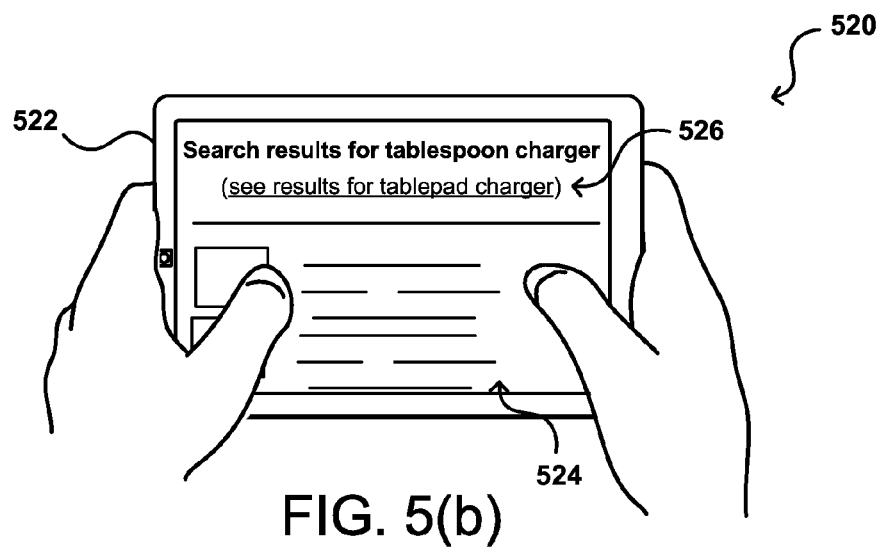

Certain embodiments do not make assumptions on the part of the user, but instead offer the user the ability to obtain more accurate or relevant content. For example, FIG. 5(*a*) illustrates an example situation 500 wherein a computing device 502 has detected an auto-correction performed (or about to be performed) by software on the device. The correction can be detected through active script, by monitoring keystrokes and corresponding input, by monitoring submitted queries, or other such approaches. In this example, the client device 502 can provide a prompt 506 or notification to the user in response to an auto-correct, asking whether the user meant to submit the uncorrected (or corrected or potentially other) version. In this example the user can select an option to submit the corrected or uncorrected version of the query 504.

While a device can learn user terms and patterns over time such that the number of such notifications can decrease, frequent such prompts can be annoying or distracting to at least some users. Accordingly, approaches in accordance with various embodiments instead give the user one or more options after the respective process has been completed. For example, FIG. 5(*b*) illustrates an example situation 520 wherein the user has submitted a query that was autocorrected. Instead of prompting the user as to which query to submit, or displaying results for both queries (which will likely contain at least some irrelevant results), the interface displayed on the computing device 522 in this example displays search results 524 that match the submitted query. In case the auto-correct was not what the user wanted, however, the interface also displays a link 526 or other element enabling the user to cause the device to instead display results for the uncorrected query. Such an approach can cause another query to be sent to a remote search service, or the results could have already been received to the client device which then changes the filter applied to the results. Other such processes can be utilized as well within the scope of the various embodiments.

Figure 6:
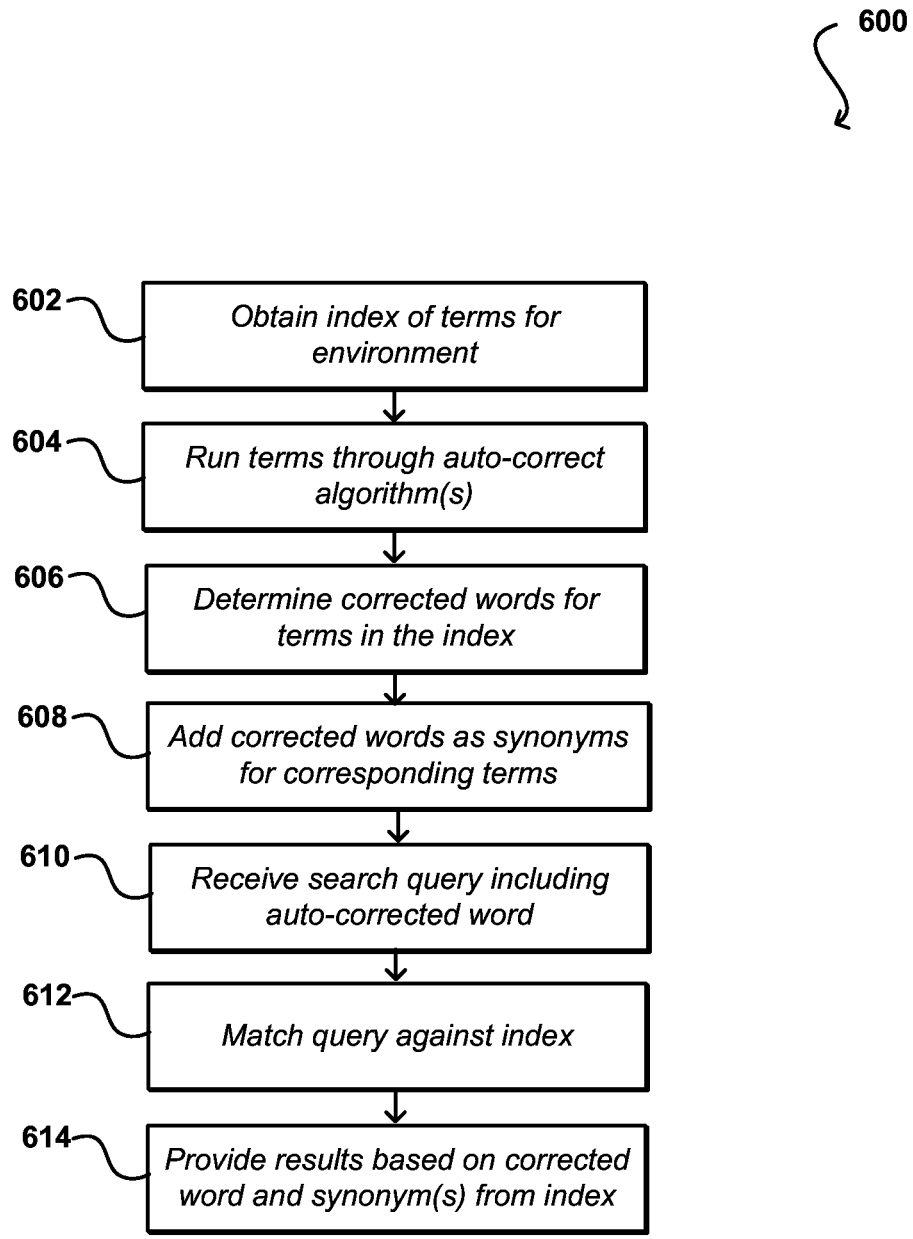
FIG. 6 illustrates an example process for managing auto-corrected text that can be utilized in accordance with various embodiments.

FIG. 6 illustrates an example process 600 for managing auto-corrected text that can be utilized in accordance with various embodiments. It should be understood, however, that there can be additional, fewer, or alternative steps performed in similar or alternative orders, or in parallel, within the scope of the various embodiments unless otherwise stated. In this example, an index, library, dictionary, or other set of terms for a specific environment is obtained 602. This can include, for example, names of products offered by an electronic marketplace, names of artists with music offered by a media provider, and the like. At least some of these terms, particularly proper names or unusual words or terms, can be run 604 through one or more auto-correct algorithms or processes to obtain a list of words that each algorithm produces upon receiving the terms from the index. The "corrected" words for specific terms can be determined 606 and then added 608 to a search index or other such grouping of terms as synonyms or alternatives for the respective terms. When a search query is then received 610 that contains one of those auto-corrected words, the query can be matched 612 against the index that includes those synonyms, and the result that are obtained and provided 614 to the user can contain results based on the "corrected" word and the synonym(s) from the index. As discussed, information such as context, frequency of correction, and type of device can be used to determine how much to weight results for each of the corrected and uncorrected terms. Also as discussed, at least portions of such a process can be performed on a client device and/or a remote server, among other such options.

In at least some embodiments a client device can send a request to a remote system or server each time a new character is entered by a user, such as to provide real-time auto-completion options or update search results dynamically. If such a situation detects the changing of an entire word in response to the entering of a single character, then that action can be indicative of an auto-correct. In such a situation, any of a number of options discussed herein can be performed, such as to analyze context to determine which version is likely correct, determine synonyms for the type of client device, etc. In some embodiments the server can capture that information and then use the "base" portion that was corrected to search for information, including any appropriate suffixes of that base. The relevance of search results for the entire query then can potentially be used to determine how much to weight results for each respective version of the corrected word, etc.

In another example that can take advantage of various embodiments, a medical records application might advantageously leverage environment-specific terms, particularly medical terminology that might not be in a conventional dictionary. An input can be entered in the application and the input selected from a set comprising a small number of terms, such as a diagnosis. The diagnosis may be such that there are a few hundred, and many of them are not in conventional device dictionaries. Another example includes applications where a user is asked to input a city name or street name, where the expanded term set can include such names. The application might also be an application in which submitted data is offered for review. The review page may identify potential corrections. The receipt of a communication can result in a confirmation prompt, with the confirmation prompt including the identification of potential corrections.

Figure 7:
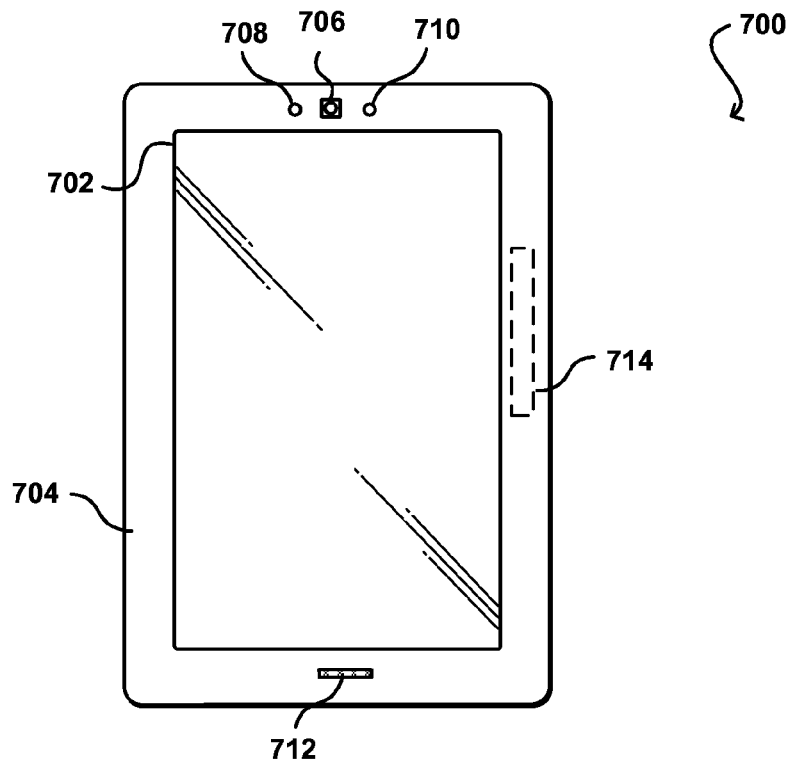
FIG. 7 illustrates an example computing device that can be utilized in accordance with various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The display screen can be a touch sensitive screen that utilizes a capacitive touch-based detection approach, for example, that enables the device to determine the location of an object within a distance of the display screen. The device also includes at least one communication component 714 operable to enable the device to communicate, via a wired and/or wireless connection, with another device, either directly or across at least one network, such as a cellular network, the Internet, a local area network (LAN), and the like. Some devices can include multiple discrete components for communicating over various communication channels.

The computing device can include at least one camera 706 or other imaging element in at least some embodiments for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. The device also includes a light sensor 708 and an illumination element 710, such as a white light or infrared (IR) LED for providing illumination to assist with image capture based at least in part upon current environmental conditions.

The example computing device 700 might also include at least one microphone 712 or other audio capture device capable of capturing audio data, such as words or commands spoken by a user of the device. In this example, a microphone is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

Figure 8:
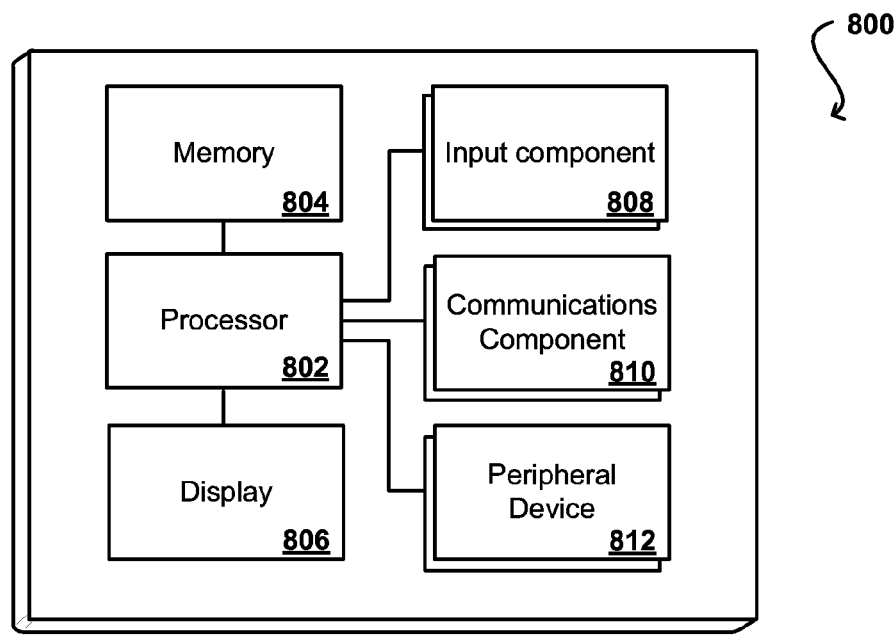
FIG. 8 illustrates an example set of components that can be utilized in a device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments can include one or more cameras or camera sensors for capturing image or video content. Such components can include at least one image capture element such as a camera or infrared sensor that is able to image projected images or other objects in the vicinity of the device. Methods for capturing images or video using a camera element with a computing device are well known in the art and will not be discussed herein in detail. The example device can similarly include at least one audio component, such as a mono or stereo microphone or microphone array, operable to capture audio information from at least one primary direction. A microphone can be a uni- or omni-directional microphone as known for such devices.

The computing device 800 of FIG. 8 can include one or more communication elements 810 or networking sub-systems, such as a Wi-Fi, Bluetooth, RF, wired, or wireless communication system. The device in many embodiments can communicate with a network, such as the Internet, and may be able to communicate with other such devices. In some embodiments the device can include at least one additional input device 808 and/or peripheral device 812 able to receive and/or process conventional input from a user. The input device can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The peripheral device can include, for example, a graphics processor, a network interface card, and the like.

The device 800 also can include at least one orientation or motion sensor (not shown). Such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

Figure 9:
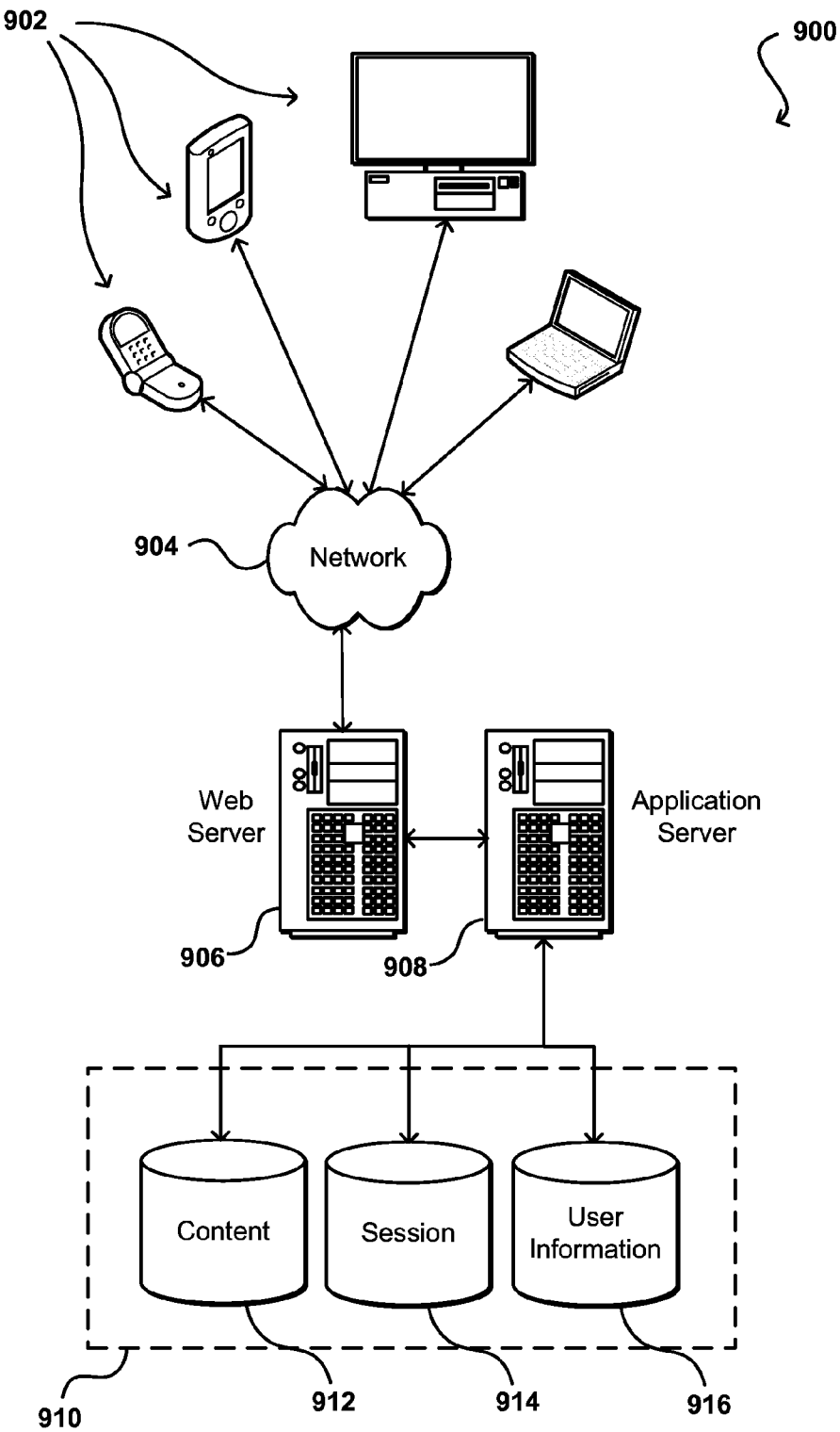
FIG. 9 illustrates an example an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, HTTP, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing automatically corrected text, comprising:
   determining a set of terms specific to an environment;
   processing each term in the set of terms using at least one text-correction algorithm to determine a subset of terms that are able to be auto-corrected by the at least one text-correction algorithm, as well as autocorrected terms for the subset of terms that were generated by the at least one text-correction algorithm, wherein an autocorrected term is generated by autocorrecting a term using the at least one text-correction algorithm, wherein processing each term in the set of terms using the at least one text-correction algorithm includes processing each term in the set of terms with a plurality of text-correction algorithms, each text-correction algorithm being utilized by at least one type of computing device;
   storing the autocorrected terms with the set of terms as a set of synonyms;
   receiving a communication including a first term that matches one of the autocorrected terms in the set of synonyms;
   determining a matching term from the set of terms for the first term;
   calculating, via at least one processor, a likelihood that the matching term was auto-corrected to the first term; and
   reverting, via the at least one processor, the first term to the matching term in the communication when the calculated likelihood meets at least one correction criterion.

2. The computer-implemented method of claim 1, wherein the communication is received from a client device, and where the set of synonyms is specific to a type of the client device.

3. A computer-implemented method, comprising:
   receiving a communication from a computing device, the communication including at least one text portion;
   analyzing the at least one text portion using a set of environment-specific terms, at least a portion of environment-specific terms in the set each having at least one corresponding autocorrected term determined by running the environment-specific term through at least one text-correction process to generate the at least one corresponding autocorrected term, wherein a given environment-specific term in the set is capable of being associated with a plurality of autocorrected terms, each of the plurality of autocorrected terms corresponding to a different text-correction algorithm;
   reverting a word in the at least one text portion of the communication to the environment-specific term associated with the corresponding autocorrected term upon a determination, via the at least one processor, that the word matches a corresponding autocorrected term in the set; and
   processing the communication.

4. The computer-implemented method of claim 3, wherein reverting the word to the environment-specific term is in response to the environment-specific term meeting at least one correction criterion with respect to the communication.

5. The computer-implemented method of claim 3, wherein processing the communication includes forwarding the communication to at least one intended recipient of the communication.

6. The computer-implemented method of claim 3, further comprising:
   running at least a portion of the environment-specific terms in the set through at least one text correction algorithm to determine the at least one corresponding autocorrected term for the portion of environment-specific terms.

7. The computer-implemented method of claim 3, wherein processing the communication includes causing advertising to be displayed on the computing device, the advertising being selected based at least in part upon the environment-specific term used to replace the word in the at least one text portions.

8. The computer-implemented method of claim 3, further comprising:
   including information with the communication indicating that the word was replaced with the environment-specific term associated with the corresponding autocorrected term, enabling a recipient of the communication to revert back to the word that was replaced.

9. The computer-implemented method of claim 3, wherein the communication from the computing device includes an indication as to whether the word corresponds to autocorrected text.

10. The computer-implemented method of claim 9, wherein the indication results from an addition of one letter to a text entry causing a change of the word corresponding to the text entry.

11. The computer-implemented method of claim 3, further comprising:
    sending a request to the computing device causing the computing device to prompt a user as to whether to correct the word to the environment-specific term.

12. The computer-implemented method of claim 3, wherein an environment-specific term is determined to match an autocorrected term when the autocorrected term was generated using a text-correction algorithm utilized by the computing device from which the communication was received.

13. The computer-implemented method of claim 3, wherein running the environment-specific term through at least one text-correction process is performed by at least one third party service.

14. The computer-implemented method of claim 3, wherein the environment-specific term is included in a domain associated with at least one of the computing device or a user of the computing device.

15. The computer-implemented method of claim 3, wherein the communication includes at least one of an email message, a text message, an instant message, a social networking post, a review submission, a medical record, an address input, or a chat message.

16. A computer system comprising:
at least one processor; and
a memory device including instructions that, when executed by the at least one processor, cause the computing system to:
determine a set of terms specific to an environment;
processing each term in the set of terms using at least one text-correction algorithm to determine a subset of terms that are able to be auto-corrected by the text-correction algorithm, as well as alternative autocorrected terms for that the subset of terms that were generated by the at least one text-correction algorithm, wherein an autocorrected term is generated by auto-correcting a term using the at least one text-correction algorithm, wherein processing each term in the set of terms using the at least one text-correction algorithm includes processing each term in the set of terms with a plurality of text-correction algorithms, each text-correction algorithm being utilized by at least one type of computing device;
store the autocorrected terms with the set of terms as a set of synonyms for use by at least one of an application or a service utilizing auto-correct functionality, each autocorrected term in the set of synonyms having a corresponding term, wherein the application or the service is configured to revert a first term to a term that corresponds to one of the autocorrected terms upon a determination, via the at least one processor, that the first term was auto-corrected to the one of the autocorrected terms.

17. The computing system of claim 16, wherein the instructions when executed further cause the computing system to:
receive a communication from a computing device, the communication including at least one word;
compare the word against the set of terms and the set of synonyms;
upon the word in the communication matching a synonym in the set of terms, reverting the word with the term corresponding to the synonym.

18. The computer system of claim 16, wherein at least a portion of the terms in the set correspond to names specific to a provider of the computing system.

19. The computer system of claim 16, wherein a term specific to an environment is determined to match an autocorrected term when the autocorrected term was generated using the text-correction algorithm utilized by the type of computing device.

20. A non-transitory computer-readable storage medium storing instructions that, when executed by at least one processor of a computing device, cause the computing device to:
receive a communication from a computing device, the communication including at least one word;
compare the word against a plurality of environment-specific terms, at least a portion of the plurality of environment-specific terms each having at least one corresponding autocorrected term determined by running the environment-specific term through at least one text-correction process to generate the at least one corresponding autocorrected term, wherein a given environment-specific term in the plurality of environment-specific terms is capable of being associated with a plurality of autocorrected terms, each of the plurality of autocorrected terms corresponding to a different text-correction algorithm;
revert the word in the communication with the environment-specific term associated with at least one autocorrected term in the set upon a determination, via the at least one processor, that the word matches the corresponding autocorrected term; and
process the communication.

21. The non-transitory computer-readable storage medium of claim 20, wherein reverting the word with the environment-specific term is in response to the environment-specific term meeting at least one correction criterion with respect to the communication.

22. The non-transitory computer-readable storage medium of claim 20, wherein processing the communication includes forwarding the communication to at least one intended recipient of the communication.

23. The non-transitory computer-readable storage medium of claim 20, wherein the instructions when executed further cause the computing device to:
pass at least a portion of the environment-specific terms in the set through at least one text correction algorithm to determine the at least one corresponding autocorrected term for the portion of the plurality of environment-specific terms.

24. The non-transitory computer-readable storage medium of claim 20, wherein processing the communication includes causing advertising to be displayed on the computing device, the advertising being selected based at least in part upon the environment-specific term used to replace the word in the at least one text portions.

25. The non-transitory computer-readable storage medium of claim 20, wherein an environment-specific term is determined to match an autocorrected term when the autocorrected term was generated using a text-correction algorithm utilized by the computing device from which the communication was received.

* * * * *